United States Patent Office

3,711,523
Patented Jan. 16, 1973

3,711,523
OXIDATION OF VICINAL GLYCOLS IN THE PRESENCE OF ORGANIC PEROXIDES AND COBALTOUS COMPOUNDS
Edmund P. Pultinas, Jr., Cincinnati, and Robert D. Temple, North College Hill, Ohio, assignors to The Procter & Gamble Company, Cincinnati, Ohio
No Drawing. Filed Sept. 4, 1970, Ser. No. 69,912
Int. Cl. C07c 51/26, 55/02, 53/22
U.S. Cl. 260—413    11 Claims

ABSTRACT OF THE DISCLOSURE

Process for preparing carboxylic acids which comprises reacting vicinal glycols with oxygen in the presence of a mixture of organic peroxides and cobalt compounds.

Background of the invention

This invention relates to a novel process for the preparation of carboxylic acids from vicinal glycols.

A variety of processes for the preparation of carboxylic acids have been known and used for many years. For example, such materials as Grignard reagents and organolithium compounds can be reacted with carbon dioxide to form the corresponding carboxylic acids. However, such processes are expensive and unsuitable for use on a commercial scale and are confined to relatively small-scale laboratory syntheses of carboxylic acids.

A primary source of the carboxylic acids in commercial use is the hydrolysis of triglycerides, for example, animal fats. However, the carboxylic acids resulting from such processes are limited to the naturally-occurring monocarboxylic acids having chain lengths most generally in the range of from about 12 to about 20 carbon atoms. Likewise the hydrolysis of plant oils and fats, for example palm oils, peanut oils, and the like, results in the formation of primarily long-chain monocarboxylic acids. Accordingly, the production of fatty acids by such processes is necessarily limited to the particular fatty acids present in the triglycerides in the natural products used.

A variety of oxidative processes, such as the air oxidation of paraffins in the presence of manganese salts, have been used extensively on a commercial scale in the preparation of industrial grades of fatty acid mixtures. The controlled oxidation of unsaturated hydrocarbons is an attractive route to carboxylic acids and various methods for achieving the controlled oxidation of olefins have been discovered. A variety of reaction products are obtainable therefrom, among which are alcohols, glycols, aldehydes and carboxylic acids.

While it is often desirable to oxidatively convert terminal olefins to their corresponding carboxylic acids, the preparation of a variety of other industrially important chemicals, especially dicarboxylic acids, from internally unsaturated fatty acids present in the triglycerides in natural fats and waxes could be achieved were it possible to oxidize the internal unsaturated linkages present in these unsaturated fatty acids. As is pointed out by MacKenzie et al., U.S. Pat. 2,820,046, the oxidation of these naturally-occurring unsaturated fatty acids at the internal olefinic position is not readily achieved by catalysts suitable for use in the oxidation of terminal olefins. MacKenzie successfully overcame the difficulty in oxidizing internal olefins to carboxylic acids by incorporating in his reaction mixtures a cobalt salt, a portion of 9,10-dihydroxystearic acid and by utilizing propanol as the solvent. The reaction probably proceeds by the formation of an intermediate vicinal glycol.

The use of cobalt salts to oxidatively cleave vicinal glycols to carboxylic acids has also been described by DeVries and Schors, Tetrahedron Letters No. 54, 5689, 1968. These workers were able to oxidize certain glycols to the corresponding carboxylic acids using certain cobalt catalysts and oxygen and by using polar, aprotic solvents in the reaction.

The copending application of Pultinas, Ser. No. 51,023, filed June 29, 1970, describes a process for preparing acids from vicinal glycols using certain catalytic mixtures of cobalt and tungsten compounds in polar, aprotic solvents.

Internal vicinal glycols, especially those formed from unsaturated fatty acids, are not readily oxidized by oxygen in the presence of either organic peroxides or cobalt salts when used singly. However, it has now been discovered that a mixed cobalt salt-organic peroxide catalyst system catalyzes the oxidative cleavage of both terminal and internal vicinal glycols, even those formed from unsaturated acids. Thus, carboxylic acids are readily prepared from both internal and terminal vicinal glycols by the process of this invention by oxidative cleavage wherein vicinal glycols are oxidized in the presence of a mixed catalyst containing both organic peroxygen compounds and cobalt compounds, as hereinafter described, to form the corresponding acids.

Accordingly, it is a primary and major object of the present invention to provide an improved process for the preparation of carboxylic acids from both terminal and internal vicinal glycols. Another object of the present invention is to provide a process for preparing mono- and dicarboxylic acids by the oxidative cleavage of carboxylic acids having vicinal glycol substituent groups. Still another object is to provide a process for oxidizing glycols which requires little or no solvent but which, if desired, can be carried out in the presence of both polar, protic and polar, aprotic solvents. These and other objects are obtained by the present invention as will become apparent from the following disclosure.

Summary of the invention

In general terms, the process of the present invention provides a means for preparing carboxylic acids by the oxidative cleavage of vicinal glycols. The cleavage of the vicinal glycol functionality and the concurrent formation of the carboxylic acid functionality is accomplished by oxidizing said vicinal glycol in the presence of a mixture of a cobalt(II) compound and an organic peroxygen compound, all as hereinafter disclosed.

More specifically, the process of the present invention comprises oxidizing a compound of the formula

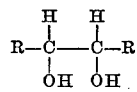

wherein each R is selected from the group consisting of hydrogen, alkyl having chain lengths from about 1 to about 30 carbon atoms and preferably from about 5 to about 20 carbon atoms, aryl (e.g., phenyl, naphthyl, and anthracenyl) and —(CH$_2$)$_n$COOM wherein $n$ is an integer of from 1 to about 20 and M is hydrogen, alkyl containing from about 1 to about 10 carbon atoms, preferably from about 1 to about 3 carbon atoms and aryl, with oxygen in the presence of a catalytic amount of a mixture of a polar organic liquid-soluble cobalt(II) compound and an organic peroxygen compound at a temperature of from about 30° C. to about 250° C.

The general reaction involved in this process is as follows:

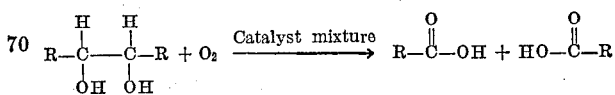

wherein R is as defined above. Terminal and internal vicinal glycols and vicinal glycols prepared from unsaturated organic acids can be oxidized by this process. The process is not limited in the choice of solvent and can be carried out in polar, protic and aprotic solvents, nonpolar solvents and in the absence of solvents, all as hereinafter detailed.

The substituted glycols suitable for use in the practice of the present invention can be obtained by a variety of well-know reactions. For example, two moles of aldehyde can be condensed with two moles of sodium in moist ether to afford vicinal glycols suitable for use in this invention. Another commonly used process affording vicinal glycols suitable for use herein is the hydrolysis of epoxides. A preferred method for the preparation of vicinal glycols involves the hydrolysis of vicinal dihalides in amide solvents as described in the copending application of Heckert, Serial No. 51,024, filed June 29, 1970. Likewise, vicinal glycols prepared by the halogenation of olefins in the presence of water and amides according to the method disclosed in the copending application of Heckert and Julian, Ser. No. 51,022 filed June 29, 1970, are suitable for use herein.

Still another preferred method for the preparation of vicinal glycols suitable for use in the practice of the present invention involves the direct hydroxylation of unsaturated compounds using a hydrogen peroxide-tungstic acid catalyst, as detailed by Luong and co-workers, J. Am. Oil Chemists Soc., 44, 316–20 (1967). By these processes, olefins, unsaturated fatty acids, unsaturated fatty acid esers and like materials, can be converted into compounds having a vicinal glycol group at the former position of unsaturation.

Exemplary vicinal glycols which can be used in the present invention and which can be prepared from the corresponding olefins by the above described processes include: 1,2-dihydroxypentane, 1,2-dihydroxyhexane, 1,2-dihydroxyheptane, 1,2-dihydroxyoctane, 1,2-dihydroxynonane, 1,2-dihydroxydecane, 1,2-hydroxydodecane, 1,2-dihydroxytetradecane, 1,2-dihydroxypentadecane, 1,2-dihydroxyhexadecane, 1,2-dihydoxyoctadecane, 1,2-dihydroxynonadecane, 1,2-dihydroxyeicosane, 2,3-dihydroxypentane, 2,3-dihydroxyhexane, 2,3-dihydroxyoctane, 2,3-dihydroxydodecane, 2,3-dihydroxytetradecane, 2,3-dihydroxynonadecane, 2,3-dihydroxyeicosane, 4,5-dihydroxydecane, 4,5-dihydroxydodecane, 4,5-dihydroxytridecane, 4,5-dihydroxytetradecane, 5,6-dihydroxypentadecane, 6,7-dihydroxyhexadecane, 6,7-dihydroxyheptadecane, 7,8-dihydroxyoctadecane, 7,8-dihydroxynonadecane, and 9,10-dihydroxyeicosane. Non-limiting examples of cyclic vicinal glycols useful herein include: dihydroxycyclopentane, dihydroxycyclohexane, dihydroxycycloheptane, dihydroxycyclooctane, dihydroxycyclononane, dihydroxycyclododecane, dihydroxycyclooctadecane, dihydroxycyclononadecane, and dihydroxycycloeicosane. Non-limiting examples of suitable branched chain vicinal glycols include: 1,4-diphenyl-2,3-dihydroxypentane, 1,10-diisopropyl-5,6-dihydroxydecane, 2-naphthyl-3,4-dihydroxytetradecane, 3-ethyl-7,8-dihydroxyheptadecane, and the like. Both the internal and terminal vicinal glycols are readily converted into the corresponding carboxylic acids by the process of this invention.

As hereinbefore stated, one advantage of the present process is that the oxidation of the vicinal glycol derivatives of a variety of unsaturated acids can be achieved. Since the fatty acids being oxidized contain an internal vicinal glycol group there results a fragmentation of the original unsaturated acid into a mono-acid and a di-acid reaction product. For example, as will be later described, oleic acid can be converted to 9,10-dihydroxystearic acid and then oxidized by the process of this invention to afford the mono-acid fragment, pelargonic acid, and the diacid fragment, azelaic acid. Likewise, unsaturated acids containing more than one unsaturated linkage can be converted to vicinal glycols, oxidized by the process of this invention and fragmented into their corresponding mono- and di-carboxylic acid reaction products. Non-limiting examples of unsaturated acids, the vicinal glycol derivatives of which are suitable for use in this oxidation, include oleic acid, linoleic acid, linolenic acid, elostearic acid, parinaric acid, ricinoleic acid, palmitoleic acid, petroselenic acid, vaccenic acid, erucic acid and mixtures thereof. Likewise, the esters of these acids, especially the methyl, ethyl and propyl esters, can be converted to the corresponding glycol derivatives and oxidized to acids. Likewise, the natural fats and oils (which are esters of glycerol) are commonly saponified to give mixtures of saturated and unsaturated acids. Such mixtures contain, for example, lauric acid, palmitic acid, and stearic acid together with some or all of the unsaturated acids hereinbefore noted. Such commercially available acid mixtures can be converted to mixtures of vicinal glycols by the methods previously noted and such glycols are suitable for use herein. The saturated acids present in such mixtures are not involved in the reaction since, by virtue of their lack of an olefinic linkage, they are not converted to vicinal glycols; the saturated acids can, of course, be removed by standard purification procedures.

Any of the common sources of unsaturated acid mixtures can be used to provide acids whose corresponding vicinal glycol derivatives can be oxidized in accordance with the present invention. Palm oil, coconut oil, babassu oil, lard, tallow, castor oil, olive oil, peanut oil, corn oil, sesame oil, cottonseed oil, soybean oil, sunflower oil, hemp oil, linseed oil, tung oil, whale oil, neat's-foot oil and the like, can all be saponified and yield unsaturated acids which can be converted to vicinal glycols which can then be oxidized by the present process.

Preferred vicinal glycols for use in this invention are: 1,2-dihydroxyoctane, 1,2-dihydroxydecane, 1,2-dihydroxydodecane, 1,2-dihydroxytetradecane, 1,2-dihydroxyhexadecane, 1,2-dihydroxyoctadecane, and mixtures thereof. The vicinal glycol derivatives of soybean oil, tallow, lard, corn oil and neat's-foot oil fatty acid mixtures are also preferred; 9,10-dihydroxystearic acid is especially preferred.

A critical aspect in the practice of the present invention is the catalyst mixture which comprises a cobalt (II) compound and an organic peroxygen compound as hereinafter detailed. The cobalt compounds suitable for use in the catalyst mixture utilized in this invention are those wherein the cobalt is in the cobaltous (+2) oxidation state and wherein said compounds are at least somewhat soluble (i.e., at least one gram per 1000 grams of solvent) in polar organic liquids, i.e., alcohols, aldehydes, ketones, amides, glycols, acids and the like. Especially preferred for use are the cobalt(II) salts of organic acids, especially carboxylic acids having from 2 to 18 carbon atoms, for example, cobalt(II) acetate, cobalt(II) propionate, cobalt(II) hexanoate, cobalt(II) decanoate, coblt(II) tetradecanoate, cobalt(II) octadecanoate, cobalt(II) benzoate and the like. Cobalt(II) salts of some of the common inorganic anions, for example, cobalt (II) bromide, cobalt(II) chloride, cobalt(II) sulfate, cobalt(II) nitrate, cobalt(II) iodide and the like, are also suitable for use in the catalyst mixture used herein. The cobalt(II) halide salts are preferred. Mixtures of these cobalt(II) compounds are likewise suitable. Especially preferred is cobalt(II) acetate. Many cobalt(II) compounds are hydrated; the anhydrous and hydrated cobalt(II) salts can be substituted, one for another, in the catalyst mixtures used herein.

The organic peroxygen component of the mixed catalyst used in this oxidation of vicinal glycols is preferably a member selected from the group consisting of organic hydroperoxides, peroxy acids of the general formula R'C(O)OOH and organic peroxides of the general formula R'OOR'', wherein R' and R'' are each alkyl groups containing from about 1 to about 20 carbon atoms or aryl (e.g., phenyl, naphthyl, anthracenyl, phenanthryl, tolyl, xylyl, nitrophenyl, nitronaphthyl, chlorophenyl and chloronaphthyl). Peroxyformates are likewise suitable. A variety of aralkyl hydroperoxides, heterocyclic peroxides, peroxyanhydrides, cyclic peroxides, ketone peroxides, peroxyesters, and polymeric peroxides are likewise suitable for use herein.

One preferred class of peroxides suitable for use in the oxidation process of this invention is the peroxyacids, the majority of which can be conveniently prepared by the reaction of hydrogen peroxide with a corresponding organic acid or organic acid chloride in the manner well-known to those skilled in the art.

All manner of organic peroxyacids are suitable for use in this oxidation process. For example, peroxyformic acid, peroxyacetic acid, peroxypropionic acid, long-chain aliphatic peroxyacids ($C_6$ to $C_{18}$) and diperoxyacids, which can be prepared from such organic di-acids as oxalic acid and azelaic acid, are all suitable for use in the catalyst mixture employed in this invention. Likewise, peroxyacids obtained from aromatic acids are suitable. For example, peroxybenzoic acid, mono-peroxyphthalic acid, diperoxyterephthalic acid, peroxynaphthoic acid, substituted peroxybenzoic acids, e.g., peroxy-p-toluic acid, p-chloroperoxybenzoic acid, peroxyfuroic acid and p-nitroperoxybenzoic acid are all suitable for use in the catalyst mixture of this invention. These acids can be prepared by the reaction of hydrogen peroxide with the appropriate organic acid or acid anhydride in the manner described in "Organic Peroxides, Their Formation and Reactions," E.G.E. Hawkins, D. Van Nostrand Company, Inc., New York, pages 161–164. Peroxyacids preferred for use in the mixed catalyst of this invention are peroxyformic acid, peroxyacetic acid, peroxybenzoic acid, p-nitroperoxybenzoic acid, m-chloroperoxybenzoic acid, p-chloroperoxybenzoic acid and mixtures thereof. Especially preferred is peroxyacetic acid.

Alternatively, organic peroxyacids can be generated in situ in the reaction mixtures utilized in this invention by the action of air or oxygen on various aldehydes. For example, acetaldehyde can be added to said reaction mixtures and therein oxidized to form peroxyacetic acid which then serves as the peroxide portion of the mixed catalyst system. Benzaldehyde can also be employed and is oxidized to peroxybenzoic acid which serves as the peroxide portion of the mixed catalyst. Many aldehydes can be used as a source for the in situ generation of peroxides useful in the practice of this invention. Preferred aldehydes which can be added to the reaction mixtures of this invention and therein oxidized to the peroxyacid component of the mixed catalyst include: acetaldehyde, propionaldehyde, butyraldehyde, hexanaldehyde, octanaldehyde, pelargonaldehyde, decanaldehyde, benzaldehyde, p-nitrobenzaldehyde, m-chlorobenzaldehyde and p-chlorobenzaldehyde.

As hereinbefore noted, organic peroxygen compounds other than peroxyacids are likewise suitable for use in the practice of this invention. For example, the hydroperoxides of 1,1-diphenylethane and triphenylmethane, prepared as disclosed by Hickle and Kooyman, J. Chem. Soc. (1953), 321, are suitable for use. Similarly suitable are the peroxides prepared from phenyl hydrazones and heterocyclic amines. Likewise, cyclic peroxides, e.g., 1,2,4,5-tetraoxycyclohexane, as prepared from cyclohexanone, hydrogen peroxide and hydrochloric acid, are suitable. The ozonalysis of olefins yields peroxides suitable for use in the mixed catalyst of this invention. For example, both tetramethylethylene and isobutene can be subjected to ozonalysis and yield dimeric acetone peroxide, while styrene yields dimeric benzaldehyde peroxide and α-methyl styrene yields diacetophenone peroxide, all of which are suitably employed in this invention. Diacylperoxides, i.e., peroxyanhydrides, especially those of acetic anhydride and the other lower alkyl carboxylic acids, are also suitable for use herein. Polymeric peroxides, such as those obtained from styrene and various vinyl polymers, e.g. vinyl acetate, methyl methacrylate, butyl methacrylate, acrylonitrile and vinylidene chloride, all function effectively in the oxidation process herein disclosed.

Another important and preferred class of organic peroxygen compounds suitable for use in the mixed catalyst system used herein are the organic peroxyesters of the formula R'C(O)OOR", wherein R' and R" are as hereinbefore disclosed. These materials are prepared in a straightforward fashion by the reaction of an acid chloride and a hydroperoxide. For example, a series of t-butyl esters of peroxyacids can be prepared from acid chlorides and t-butylhydroperoxide reacted in petrol at 15° C. Such t-butylperoxyesters represent another preferred class of peroxides for use in this invention. Especially preferred peroxyesters include: t-butylperoxybenzoate, t-butylperoxyacetate and t-butylperoxydecanoate.

It is to be understood that the catalyst mixture employed herein consists of the combination of any of the hereinbefore detailed organic peroxygen compounds or aldehyde peroxide precursors and any of the hereinbefore detailed cobalt(II) compounds in the proportions as hereinafter detailed. Non-limiting examples of combinations of cobalt(II) compounds and organic peroxides suitable for use as the mixed catalyst employed in the practice of this invention include mixtures of: cobalt(II) acetate and peroxyacetic acid, cobalt(II) acetate and decanal, cobalt(II) decanoate and t-butylperoxybenzoate, cobalt(II) bromide and peroxyformic acid, a mixture of cobalt(II) bromide and cobalt(II) acetate (1:1, by weight) and propionaldehyde, cobalt(II) butyrate and peroxybutyric acid, cobalt(II) hexanoate and peroxyoctanoic acid, cobalt(II) formate and diperoxyoxalic acid, cobalt(II) benzoate and diperoxyterephthalic acid, cobalt(II) benzoate and m-chloroperoxybenzoic acid, cobalt(II) heptanoate and 1,2,4,5-tetraoxycyclohexane, cobalt(II) butyrate and dimeric benzaldehyde peroxide and cobalt(II) acetate and peroxidized vinyl acetate. Hydrated cobalt(II) salts can be freely substituted for anhydrous cobalt(II) salts in the catalyst mixtures employed in this invention. Preferred catalysts for use in this invention are the mixtures: (1) cobalt(II) acetate and peroxyactic acid and (2) cobalt(II) acetate and decanal.

The amount of the mixed catalyst present in the reaction mixture can vary over a range from about 5% to about 50%, more preferably from about 8% to about 25%, by weight of vicinal glycol being oxidized. For example, the organic peroxygen compound can be used in amounts ranging from about 5% to about 50%, more preferably from about 15% to about 35%, by weight of the glycol being reacted. The cobaltous salt is used in amounts rangings from about 5% to about 50%, more preferably from about 5% to about 15%, by weight of the glycol being reacted. The weight ratio of cobalt salt to peroxygen compound can range from about 1:20 to about 20:1, but this is not critical. A 1:1 weight ratio of cobalt (II) compound and organic peroxygen compound is convenient. It is sometimes convenient to initiate the reaction by using concentrations of 10% to 20%, by weight, of the cobaltous compound, based on the glycol initially present in the reaction mixture and, thereafter, to introduce additional glycol containing from about 5% to about 10%, by weight, of the cobaltous compound to said reaction mixture. Likewise, about 25% by weight, based on glycol, of the peroxygen compound can be added to help initiate the reaction and additional glycol thereafter added to subsequently lower the peroxygen:glycol ratio. Thus, the reaction can be initiated almost immediately and then moderated by reducing the total percentage of cobaltous and organic peroxygen compounds present in the reaction mixture to the preferred range. This procedure is especially useful when performing the reaction at the lower temperatures in the range or when air, rather than pure oxygen, is being used as the oxidant. Likewise, oxidation of sterically hindered glycols is conveniently initiated in this manner.

The process of this invention can be carried out in the presence or absence of a solvent. When it is elected to oxidize vicinal glycols in the herein disclosed manner in the absence of a solvent, the organic peroxygen compound (or aldehyde peroxide precursor) and cobalt(II) salt are simply admixed with the vicinal glycol, which dissolves the cobalt compound, and oxygen or air is bubbled through the reaction mixture which is maintained at an optimum temperature as hereinafter disclosed. When the oxidation is carried out in the absence of solvent the reaction proceeds in an entirely satisfactory manner to yield carboxylic acids. However, when viscous, semisolid or solid vicinal glycols are being oxidized, operating difficulties with regard to the introduction of the oxygen, or air, into the mixture may be encountered. In such cases this difficulty can be alleviated by increasing the reaction temperature so as to render the vicinal glycol less viscous. Likewise, a small amount of a liquid organic acid or alcohol, e.g., nonanoic acid or octanol, can be added to the mixture as a diluent so as to further reduce the viscosity. Good stirring by means of any of the common laboratory mixers also aids in keeping the vicinal glycol in a more liquid state.

Alternatively, this oxidation of vicinal glycols can be performed in a liquid medium. When a liquid medium is used, the vicinal glycol is usually dissolved therein and the cobalt(II) salt and peroxygen compound (or aldehyde from which peroxide is to be generated in situ) are added thereto. Oxygen, or air, is then bubbled through the reaction mixture which is held at the proper reaction temperature. Most often, it is advantageous to select a liquid in which the vicinal glycol is soluble, however, this is not critical. When a liquid in which the vicinal glycol is not soluble is used, it is best that high speed stirring be employed to insure good contact between the suspended vicinal glycol and oxygen and to dissolve the cobalt(II) compound in the suspended glycol. Of course, when the vicinal glycol is merely suspended, rather than dissolved in the liquid, the reaction will require a much longer time for completion. It is therefore much preferred that the liquid medium employed be a solvent for the glycol being oxidized.

The vicinal glycols are soluble in a variety of solvents and this solubility depends somewhat on the organic group of the glycol. That is to say, high molecular weight glycols in which the molecular ratio of hydrocarbon group to glycol group is high are soluble in hydrocarbon solvents such as the lower alkanes, i.e., hexane, octane, decane and mixtures thereof such as kerosene and light mineral oils and these are suitable for use herein. However, due to the polar glycol group, it is more preferred to use a polar solvent when practicing this invention. The polar solvents suitable for use in the practice of this invention are chosen so that they are minimally reactive or non-reactive with the glycol functionality or the catalyst since this would interfere with the glycol oxidation. Also, the materials chosen should be liquid at the reaction temperature employed and solubilize the cobalt(II) compound in the catalyst mixture. Polar organic liquids such as organic acids, organic acid esters, sulfoxides, sulfones, alcohols, ketones, aldehydes and amides are all suitable solvents in the practice of this invention.

Alcohols suitable for use as solvent are those having the formula R'''OH, wherein R''' represents a carbon chain having from 1 to about 12 carbon atoms and cyclic hydrocarbon groups in the same range. Primary, secondary and tertiary alcohols are all suitable. Alcohols such as methanol, ethanol, propanol, isopropanol, butanol, t-butanol, pentanol, 2-hydroxypentane, 1-octanol, 2-octanol, 3-octanol, 1-decanol, 2-decanol, 3-decanol, 3-methyl-4-hydroxydecane, cyclopentanol, cyclohexanol and cyclooctanol are all suitable for use as solvents in the herein described oxidation. Especially preferred alcohols are propanol, isopropanol, t-butanol and decanol. Alcohol mixtures are likewise suitable.

Organic acids suitable for use as solvents have the general formula R'''C(O)OH, wherein R''' is as hereinbefore described and hydrogen. Formic acid, acetic acid, propionic acid, butyric acid, octanoic acid, nonanoic acid, decanoic acid and mixtures thereof, are all suitable for use as solvent, with acetic acid, nonanoic acid and decanoic acid being preferred. When acids are employed as solvents, some esterification of the glycol can occur and the oxidation product yield decreased by about ten percent. Yields can be improved by hydrolysis of such esters with base followed by further oxidation according to the process of this invention, as detailed in Example V, and nearly quantitative yields of carboxylic acids are obtained.

Sulfoxides which can be used as solvents have the formula R'''S(O)R''', wherein R''' is as hereinbefore noted. Dimethyl sulfoxide, diethyl sulfoxide, decylmethyl sulfoxide, decylethyl sulfoxide and mixtures thereof, are all suitable for use, with dimethyl sulfoxide being preferred. Likewise, the corresponding sulfones having the formula R''' S(O)(O)R''', with R''' as before, are suitably employed as solvents herein.

The esters of organic acids represent still another class of polar solvents which can be employed in the oxidation of glycols by this process. Such esters have the formula R'''C(O)OR''', where R''' is as hereinbefore disclosed, as well as benzyl and phenyl. Non-limiting examples of esters of organic acids which have utility as solvents herein include: methyl acetate, ethyl acetate, propyl acetate, butyl acetate, methyl propionate, ethyl propionate, methyl pentanoate, ethyl pentanoate, decyl decanoate, methyl benzoate, methyl formate, ethyl formate, benzyl acetate, cyclopentyl formate, cyclohexyl acetate, isopropyl acetate and isopropyl benzoate. Any of these organic acid esters can be prepared by the action of the acid or acid halide on the appropriate alcohol in the manner well-known to those skilled in the art. Especially preferred esters of organic acids suitable for use as solvents herein are ethyl formate, methyl acetate, ethyl acetate, methyl decanoate and ethyl decanoate.

Aldehydes of the formula R'''CH(O) and ketones of the formula R'''C(O)R''', with R''' as hereinbefore noted, can also be used as solvents. Preferred aldehydes include decanaldehyde, pelargonaldehyde, octanaldehyde, propionaldehyde and acetaldehyde. Preferred ketones include acetone, methylethylketone and methyldecylketone.

Amides preferred for use are the N,N-disubstituted amides having the general formula R'''C(O)NR'''R''', wherein R''' is as above. Non-limiting examples of N,N-disubstituted amides suitable for use as the solvent in the practice of this invention include: dimethylformamide, diethylformamide, dipropylformamide, dibutylformamide, dioctylformamide, didecylformamide, dimethylacetamide, dimethylpropionamide, dimethylbutyramide, dimethylpentamide, dimethyloctanamide, dimethyldecanamide, diethylacetamide, dipropylpropionamide, diphenylbutyramide and methylphenylacetamide. Any of these amides can be prepared by the condensation of the corresponding acid or acid halide with the corresponding disubstituted amine in the manner well-known to those skilled in the art. Especially preferred for use as solvent herein are dimethylformamide and dimethylacetamide.

As can be seen from the foregoing, the process of this invention can be satisfactorily performed in a variety of organic solvents or in the absence of solvent. Of the solvents herein detailed as being suitable for use in the practice of this invention, the most preferred are acetic acid, pelargonic acid and dimethylacetamide.

Reaction temperatures of from about 30° C. to about 250° C. can be employed in the oxidation process of this invention. At the higher temperatures of this range it will be recognized that many of the peroxides recited herein as catalysts will be unstable and operating difficulties may be encountered. Therefore, it is preferable to employ reaction temperatures in the range from about 30° C. to about 150° C. when practicing this invention. It will be further recognized that the time required for complete oxidation of the vicinal glycols will depend on the reaction temperature employed. This time will vary from a few minutes to several hours and will be unnecessarily prolonged at the lower temperatures in the range. Hence, it is most preferable that the present process be done at temperatures from about 70° C. to about 100° C. Reaction times at these most preferred temperatures will vary somewhat with reactant concentrations but, in general, reaction times from about 30 minutes to 4 hours are used. When air, instead of oxygen, is used, somewhat longer times will be needed due to an induction period in the reaction.

Reaction pressures are not critical in this process and any convenient pressure can be used.

The following examples illustrate the practice of this invention but are not intended to be limiting thereof.

Oxidation of vicinal glycols to carboxylic acids

In the following examples the acid value (AV) of the reaction mixture is used as one measure of the completeness of the oxidation of the vicinal glycol of the carboxylic acids. The acid value is the number of milligrams of potassium hydroxide necessary to neutralize the fatty acids in a one-gram sample. Acid value measurements are commonly used for this purpose and are described in the American Oil Chemists Society method Te 1a–64T.

EXAMPLE I

Oxidation of 9,10-dihydroxystearic acid in dimethylacetamide

A solution of peroxyacetic acid was prepared by admixing 29 mls. of glacial acetic acid, 15 mls. of 70% (w./w.) $H_2O_2$ and 0.4 g. of concentrated sulfuric acid in an ice-water bath. The mixture was held at 40° F. overnight and was then ready for use.

9,10-dihydroxystearic acid (10 g.) was dissolved in 30 g. of dimethylacetamide (dried over $Na_2SO_4$) and added to a 100 ml. flask. 0.4 g. cobalt(II) acetate·$4H_2O$ was added thereto and the mixture was allowed to stand overnight. Cold peroxyacetic acid, prepared as above, was added to the mixture and an exothermic reaction ensued. Oxygen was bubbled through the mixture which was heated to 100° C. with constant stirring. The oxygen addition was continued for about 2½ hours. Following this, a sample was withdrawn and analyzed by gas-liquid chromatography (GLC) and found to contain a mixture of azelaic and pelargonic acids.

An equivalent molar amount of cobalt (II) propionate, cobalt(II) hexanoate, cobalt(II) decanoate, cobalt(II) benzoate, cobalt(II) bromide and a 1:1 (weight) mixture of cobalt(II) acetate and cobalt(II) bromide, respectively, is substituted for the cobalt(II) acetate·$4H_2O$ and the reaction is run at 30° C. and 150° C. with substantially the same results in that the 9,10-dihydroxystearic acid is oxidized to a mixture of azelaic and pelargonic acids.

The dimethylacetamide is replaced with an equivalent amount of acetic acid, ethylacetate, decanoic acid, ethyldecanoate, nonanoic acid, methylnonanoate, methyl alcohol, ethyl alcohol, and 1-decanol, respectively, and the same results are obtained in that the vicinal glycol is oxidized to azelaic and pelargonic acid.

EXAMPLE II

Oxidation of 9,10-dihydroxystearic acid in the presence of decanal (decane aldehyde)

32 g. of 9,10-dihydroxystearic acid and 6.4 g. of decanal were heated to 100° C. and oxygen was bubbled through the mixture. 0.6 g. of cobalt(II) acetate·$4H_2O$ was added to the mixture of acid and aldehyde; oxygen addition was continued. The reaction mixture was somewhat pasty, but after about one hour of oxygen addition an exothermic reaction ensued and the mass liquified. After 4.5 hours of oxygen addition a sample analyzed by GLC indicated the formation of azelaic and pelargonic acids. (Decanoic acid was also formed from the decanal.) The acid value of the reaction mixture was 360, indicating a good product yield.

The decanal is replaced with an equivalent amount, on a mole basis, of propionaldehyde, butyraldehyde, pentanaldehyde, hexanaldehyde, heptanaldehyde, octanaldehyde, pelargonaldehyde, benzaldehyde, p-nitrobenzaldehyde, m-chlorobenzaldehyde and p-chlorobenzaldehyde, respectively, and the reaction is run at 90° C. and 130° C.; the vicinal glycol is oxidized to acids.

The cobalt(II) acetate is replaced with a molar equivalent of cobalt(II) propionate, cobalt(II) hexanoate, cobalt(II) decanoate, cobalt(II) benzoate, cobalt(II) bromide and a 1:1 (weight) mixture of cobalt(II) acetate and cobalt(II) bromide, respectively, and the reaction is run at 30° C. and 150° C. with substantially the same results in that the 9,10-dihydroxystearic acid is oxidized to a mixture of azelaic and pelargonic acids.

An equivalent amount of 1,2-dihydroxyoctane, 1,2-dihydroxydecane, 1,2-dihydroxydodecane, 1,2-dihydroxytetradecane, 1,2-dihydroxyhexadecane and 1,2-dihydroxyoctadecane, respectively, is substituted for the 9,10-dihydroxystearic acid and oxidized to heptanoic acid, nonanoic acid, undecanoic acid, tridecanoic acid, pentadecanoic acid and heptadecanoic acid, respectively.

An equivalent amount of vicinally hydroxylated soybean oil, tallow, lard, neat's-foot oil and corn oil fatty acid mixtures, based on glycol substituents, is substituted, respectively, for the 9,10-dihydroxystearic acid with substantially the same result in that these vicinal glycol derivatives are oxidized to mixtures of carboxylic acids.

EXAMPLE III

Oxidation of 9,10-dihydroxystearic acid in acetic acid solvent 15 g. of 9,10-dihydroxystearic acid was dissolved in 45 g. of glacial acetic acid and 2.48 g. of cobalt(II) acetate and 4.3 g. of peroxyacetic acid (prepared as in Example I) were added thereto. The reaction mixture was heated to 70° C. and oxygen was bubbled through the reaction mixture continuously. After approximately 2 hours, GLC indicated that azelaic and pelargonic acids had been formed.

Formic acid, propionic acid, butyric acid, octanoic acid, nonanoic acid, decanoic acid and mixtures thereof, are substituted, respectively, in equivalent volumes for the acetic acid and equivalent results are obtained in that the 9,10-dihydroxystearic acid is oxidized.

In an alternate process, air, instead of oxygen, is bubbled through the reaction mixture while the temperature of the mixture is maintained at about 70° C. with external heating. The reaction exhibits an induction period of about 2 hours, after which it proceeds in the usual fashion to yield a mixture of azelaic and pelargonic acids.

The reaction is run in dimethylformamide, pelargonic acid and diethyl acetamide, respectively, at 30° C., 150° C. and 250° C.; the vicinal glycol is oxidized to acids.

An equivalent amount of 1,2-dihydroxyoctane, 1,2-dihydroxydecane, 1,2-dihydroxydodecane, 1,2-dihydroxytetradecane, 1,2-dihydroxyhexadecane, 1,2 - dihydroxyoctadecane and 9,10-dihydroxyethylstearate, respectively, is substituted for the 9,10-dihydroxystearic acid and oxidized to carboxylic acids in like fashion.

An equivalent amount of vicinally hydroxylated soybean oil, tallow, lard, neat's-foot oil and corn oil fatty acid mixtures is substituted, respectively, for the 9,10-dihydroxystearic acid and the reaction is run at 30° C. and 100° C.; the glycols are oxidized to acids.

The cobalt(II) acetate is replaced, respectively, with a molar equivalent of cobalt(II) propionate, cobalt(II) hexanoate, cobalt(II) decanoate, cobalt(II) benzoate, cobalt(II) bromide and a 1:1 mixture of cobalt(II) acetate and cobalt(II) iodide and the reaction is run at 30° C. and 150° C. The same results are obtained in that the vicinal glycol is oxidized to the mixture of carboxylic acids.

EXAMPLE IV

Oxidation of 9,10-dihydroxystearic acid in excess pelargonic (nonanoic) acid 32.0 g. of 9,10-dihydroxystearic acid, 16.0 g. of pelargonic acid and 1.6 g. of pentadecanoic acid were admixed and heated until just liquid. 0.5 g. of cobalt(II) acetate·4H$_2$O and 9.6 g. of peroxyacetic acid prepared from acetic acid, hydrogen peroxide and sulfuric acid (catalyst) in the usual fashion, were added thereto. The reaction mixture was heated to 100° C. and oxygen was bubbled therethrough. The initial AV was 263 and the AV of the mixture was 405 after 4 hours' reaction. The acetic acid formed from the decomposition of the peroxyacetic acid was removed by evaporation and the AV of the resulting mixture was 381, indicating good conversion of the 9,10-dihydroxystearic acid to a mixture of pelargonic and azelaic acids. Chromatography (GLC) confirmed the formation of pelargonic and azelaic acids from the 9,10-dihydroxystearic acid.

The mixed pelargonic and pentadecanoic acid diluent is replaced by an equal volume of methanol, ethanol, decanol, octanol and 2-hydroxypentanol, respectively, and the reaction is run at 30° C. and 150° C.; the 9,10-dihydroxystearic acid is oxidized to a mixture of pelargonic acid and azelaic acid.

The cobalt(II) acetate·4H$_2$O is replaced with a molar equivalent of cobalt(II) propionate, cobalt(II) hexanoate, cobalt(II) decanoate, cobalt(II) benzoate, cobalt(II) bromide, cobalt(II) chloride and a 1:1 mixture of cobalt(II) acetate and cobalt(II) bromide, respectively, and the reaction is run at 30° C., 70° C., 100° C. and 150° C.; the same results are obtained in that the vicinal glycol is oxidized to carboxylic acids.

The peroxyacetic acid is replaced by t-butylperoxybenzoate, peroxyformic acid, peroxypropionic acid, peroxybenzoic acid, p-nitroperoxybenzoic acid, p-chloroperoxybenzoic acid, t-butylperoxyacetate, t-butylperoxydecanoate, 1,2,4,5-tetraoxycyclohexane, peroxycamphoric acid and dimeric acetone peroxide, respectively, and equivalent results are obtained in that 9,10-dihydroxystearic acid is oxidized to a mixture of pelargonic and azelaic acids.

The peroxyacetic acid is replaced by acetaldehyde, propionaldehyde, butyraldehyde, pentanaldehyde, hexanaldehyde, octanaldehyde, pelargonaldehyde, benzaldehyde and decanaldehyde, respectively, and the reaction is run for 6 hours at 70° C. and 120° C. with substantially the same results.

In an alternate process, air is bubbled through the reaction mixture instead of oxygen while the temperature of the reaction mixture is maintained at about 100° C. The reaction exhibits an induction period of about 2 hours, after which it proceeds in the usual fashion with the oxidation of the glycols to organic acids.

EXAMPLE V

Oxidation of 9,10-dihydroxystearic acid employing saponification 15 g. of 9,10 - dihydroxystearic acid is dissolved in 100 ml. of glacial acetic acid and 3.5 g. of cobalt(II) acetate and 4.3 g. of peroxyacetic acid is added thereto. The reaction mixture is heated at 100° C. and air is bubbled through the mixture continuously for three hours. The reaction mixture is filtered to remove insolubles and the acetic acid solvent is removed by evaporation under reduced pressure. The reaction mass is taken up in methyl alcohol and made basic with five molar alcoholic potassium hydroxide. The basic alcoholic solution of the reaction product is heated for 15 minutes on a steam bath and then neutralized with hydrochloric acid. The reaction mixture is filtered to remove insolubles (mainly sodium chloride) and 1 g. of cobalt(II) acetate and 2 grams of fresh peroxyacetic acid are added thereto. Oxygen is again bubbled through the mixture which is held at reflux temperature for a period of one hour. Isolation of the reaction products chromatographically results in nearly quantitative yields of a mixture of azelaic and pelargonic acids.

The reaction is run in formic acid, propionic acid, butyric acid, octanoic acid, nonanoic acid and decanoic acid, respectively, and the same results are obtained in that quantitative yields of azelaic acid and pelargonic acid are recovered.

The acetic macid solvent is replaced with ethyl formate, methyl acetate, ethyl acetate, methyl decanoate and ethyl decanoate, respectively, and the reaction is run at 30° C. and 150° C. with equivalent results in that azelaic and pelargonic acids are formed.

The reaction is carried out in propanol, isopropanol, t-butanol, decanol, methanol, respectively, and mixtures thereof and carboxylic acids are obtained.

EXAMPLE VI

Oxidation of 1,2-diphenyl-1,2-dihydroxyethane 42.4 grams of 1,2-diphenyl-1,2-dihydroxyethane is dissolved in 100 ml. of pelargnoic acid and 0.7 g. of cobalt (II) acetate and 2.3 g. of peroxyacetic acid added thereto. The reaction mixture is heated to 100° C. and oxygen is bubbled through the mixture until an exothermic reaction ensues. Following this, the reaction mixture is diluted with 25 ml. of glacial acetic acid and an additional 40 g. of the vicinal glycol added thereto. Oxygen addition is continued and the reaction temperature is maintained at 100° C. for an additional three hours, after which the acid solvent is removed by distillation and the benzoic acid reaction product recovered.

The 1,2-diphenyl-1,2-dihydroxyethane is replaced with 1,2 - dinaphthyl-1,2-dihydroxyethane, 1,2-dihydroxy-1,2-bis-triacontylethane; 7,8-dihydroxynonadecane, phenyl-9, 10-dihydroxystearate, 9,10 - dihydroxyeicosane, 1,2 - bis-eicosyl-1,2-dihydroxyethane, dihydroxycyclohexane, dihydroxycyclononane, dihydroxycycloeicosane and 3-ethyl-7,8-dihydroxyheptadecane, respectively, and the reaction is run at 30° C., 150° C. and 250° C. with equivalent results in that the vicinal glycols are oxidized at the glycol position to carboxylic acids.

The peroxyacetic acid is replaced by peroxybenzoic acid, peroxycamphoric acid, butyraldehyde, hexanaldehyde, benzaldehyde, diperoxyterephthalic acid, polymeric peroxymethylmethacrylate, dimeric acetone peroxide and 1:1 mixture of p-chloroperoxybenzoic acid and m-chloroperoxybenzoic acid, respectively, with substantially the same results in that the vicinal glycols are oxidized to carboxylic acids.

The reaction is run in propionaldehyde, methyl ethyl ketone, dimethyl propionamide, diphenyl butyramide, butyl acetate, cyclopentyl formate, dimethyl sulfoxide, cyclopentanol, pentanol, and dimethyl sulfone solvents, respectively, and acid reaction products are obtained.

Cobalt(II) decanoate, cobalt(II) hexanoate, cobalt(II) benzoate, cobalt(II) naphthalenoate and cobalt(II) octadecanoate, respectively, are substituted for the cobalt(II) acetate; the reaction is run at 70° C. and 120° C. and the glycols are oxidized to carboxylic acids.

What is claimed is:

1. A process for preparing carboxylic acids from vicinal glycols of the formula

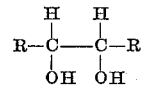

wherein each R is hydrogen, alkyl having chain lengths from about 1 to about 30 carbon atoms, aryl or —(CH$_2$)$_n$COOM wherein $n$ is an integer of from 1 to about 20 and M is hydrogen, alkyl containing from 1 to about 10 carbon atoms or aryl, comprising oxidizing said vicinal glycols with oxygen in the presence of a catalytic amount of a mixture of a polar organic liquid-soluble cobalt(II) compound and an aliphatic peroxyacid of the formula R'C(O)OOH, wherein R' is an alkyl group containing 1 to about 20 carbon atoms.

2. A process according to claim 1 wherein the cobalt-(II) compound is a member selected from the group consisting of organic acid salts of cobalt(II) and halide salts of cobalt(II).

3. A process according to claim 1 wherein the peroxyacid is generated in the reaction mixture from an aldehyde selected from the group consisting of acetaldehyde, propionaldehyde, butyraldehyde, hexanaldehyde, octanaldehyde, perlargonaldehyde and decanaldehyde.

4. A process according to claim 1 wherein the mixture of cobalt(II) compound and organic peroxyacid is in the ratio range from about 1:20 to about 20:1 by weight.

5. A process according to claim 1 wherein the mixture of cobalt(II) compound and organic peroxyacid is present at a concentration in the range from about 5% to about 50% by weight of vicinal glycol.

6. A process according to claim 1 wherein the catalyst is a mixture of cobalt(II) acetate and peroxyacetic acid.

7. A process according to claim 1 in which the oxidation is carried out in the presence of a solvent selected from the group consisting of acetic acid, perlargonic acid and dimethylacetamide.

8. A process according to claim 1 which is carried out at a temperature of from about 30° C. to about 150° C.

9. A process according to claim 1 wherein the vicinal glycol is a member selected from the group consisting of 1,2-dihydroxyoctane, 1,2-dihydroxydecane, 1,2-dihydroxydodecane, 1,2-dihydroxytetradecane, 1,2 - dihydroxyhexadecane, 1,2 - dihydroxyoctadecane and 9,10 - dihydroxystearic acid.

10. A process according to claim 1 wherein the vicinal glycol is a derivative of unsaturated glyceride acids.

11. A process according to claim 1 which is carried out in the presence of cobalt(II) acetate and a member selected from the group consisting of peroxyacetic acid and decanal and wherein the glycol is 9,10-dihydroxystearic acid.

References Cited

UNITED STATES PATENTS 2,585,129   2/1952   Gekhart et al. ----- 260—531 R

FOREIGN PATENTS 809,452   2/1959   Great Britain ------ 260—531 R

OTHER REFERENCES

DeVries et al., Tetrahedron Letters, No. 54, pp. 5689–5690 (1968).

LORRAINE A. WEINBERGER, Primary Examiner

R. D. KELLY, Assistant Examiner

U.S. Cl. X.R.

260—514 R, 523 A, 531 R